United States Patent [19]
Neumeister

[11] 3,790,026
[45] Feb. 5, 1974

[54] CORN PLANTER
[76] Inventor: Roger Neumeister, R.D. No. 1, Box 307, Ashland, Pa. 17921
[22] Filed: Mar. 19, 1973
[21] Appl. No.: 342,465

[52] U.S. Cl.............................. 221/211, 221/278
[51] Int. Cl............................................. A01c 7/04
[58] Field of Search.... 221/211, 278; 222/217, 220, 222/224, 222, 266; 243/16; 111/74, 77

[56] References Cited
UNITED STATES PATENTS
3,637,108  1/1972  Loesch............................... 221/211
3,731,842  5/1973  Schlegel............................. 221/278

Primary Examiner—Stanley H. Tollberg
Assistant Examiner—C. A. Marmor

[57] ABSTRACT

A seed planter of the type having an air pressured drum rotated about its axis by a trailer, which drum has a plurality of longitudinal rows of perforated pockets spaced evenly about the periphery of the drum. A plurality of separate rubber tired wheels are mounted on separate pivotal arms on the trailer frame for contacting selective peripheral rows of pockets denoting desired rows of seeds to be planted, whereby the blocked holes allow the seeds to be blown into discharge pipes leading to the furrows of the rows to be planted. Each arm is pivoted by a cable connected at one end to the arm and, at the other end to a control knob in the cabin of a tractor.

2 Claims, 3 Drawing Figures

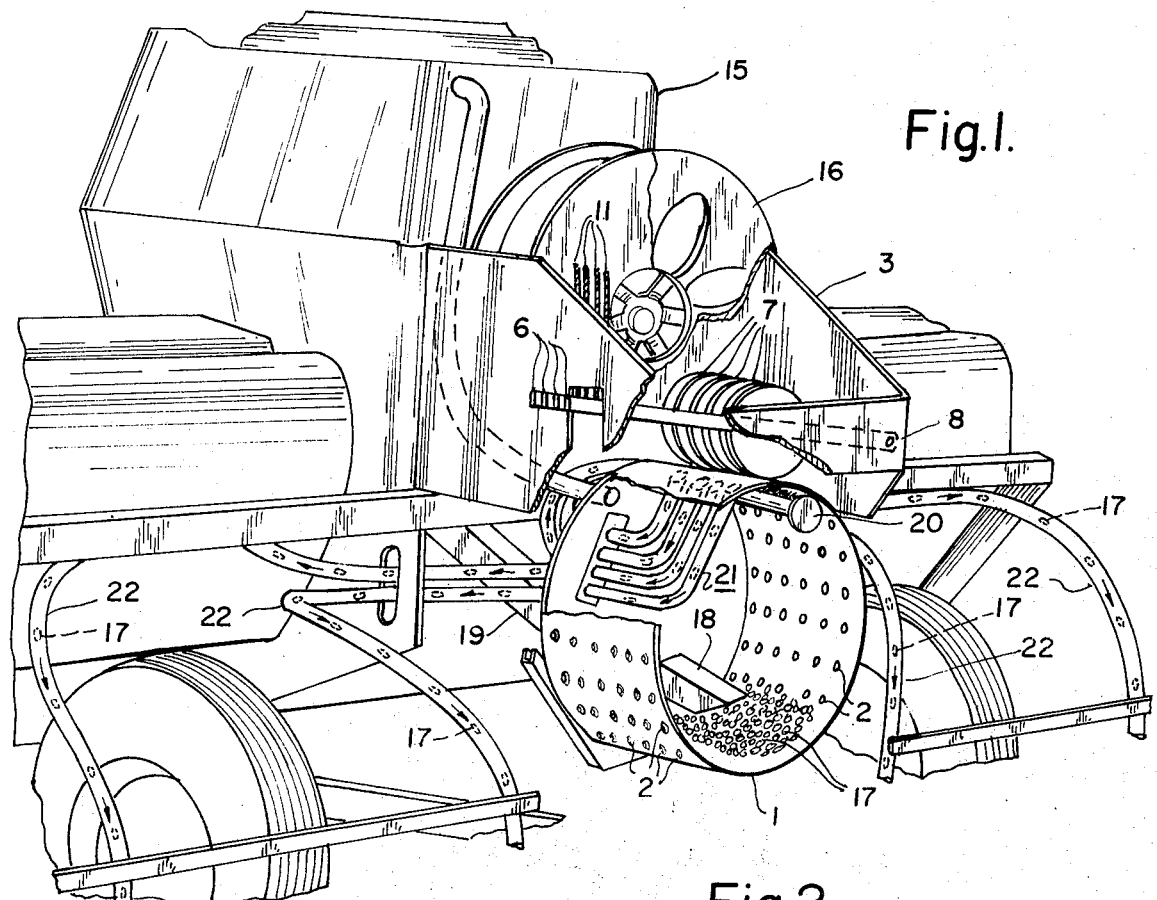
Fig.1.
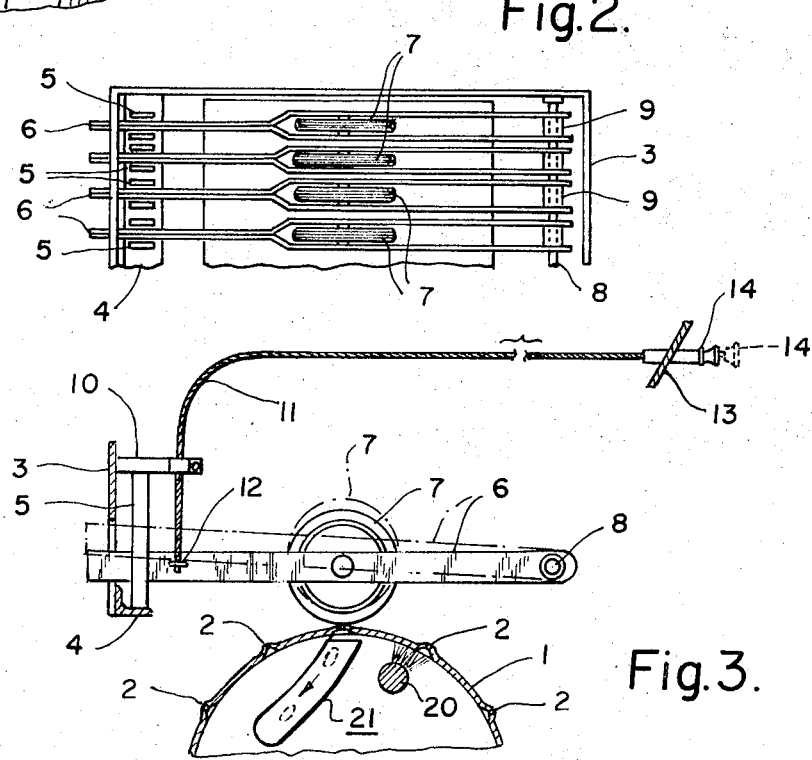
Fig.2.
Fig.3.

CORN PLANTER

This invention relates generally to a corn planter and, more particularly, to a control system for enabling selective planting of any particular row or plurality of rows.

An outstanding disadvantage of conventional corn planters is that they plant a plurality of rows at the same time and it is impossible to select the planting of one, two or three rows at a time, instead. This makes planting inflexible and forces the use of more seed than required in some instances.

An object of the present invention is to provide a novel corn planter that is devoid of the abovenamed disadvantage and which enables easy and speedy selection and control for planting any one, two, three or more rows at any one time, therefore adding greatly to the versatility of planting.

A more specific object of the invention is to provide a novel corn planter with a plurality of individual controls for effecting selective drive by the corn seed drum by frictional means, whereby any particular row or any number of rows may be selectively planted simultaneously.

Other objects and advantages will become more apparent from a study of the following description taken with the accompanying drawing wherein:

FIG. 1 is a perspective view of a planter embodying the principles of the present invention;

FIG. 2 is a fragmentary, top view of a drive control therefor of the present invention; and FIG. 3 is an elevational view of the drive control.

Referring more particularly to FIGS. 1, 2 and 3 of the drawing, shows a 4 or 6 row planter of the CYCLO type manufactured by International Harvester Co. of Chicago, Ill. Numeral 1 generally denotes a seed drum, driven by the trailers which drums contains seeds 17, such as corn, milo, beans or other seeds, which drop out of a plurality of circumferentially disposed perforated pockets 2 along the periphery of the drum.

In accordance with the present invention, a framework 3 is rigidly mounted on the trailer and has connected to the base thereof an angle iron 4 which supports a U-shaped guide 5 which serves to guide pivotal movements of a bifurcated arm 6 on which one of the rubber-tired wheels 7 is rotatably mounted. Rod 6 is pivoted on pivot pin 8. At the extremity of the rod there is provided a terminal 12 of a flexible rod which passes through tube 11 having an extremity rigidly secured to the dash board 13 at the operator's tractor seat. The extremity of the rod is secured to a knob 14.

In operation, when knob 14 is pulled by the operator so as to pull the flexible rod and its terminal 12, arm 6 will move upwardly to the dotted line position wherein wheel 7 is out of contact with the corn seed drum 1 and no longer blocks the holes of the corresponding row. However, when knob 14 is pushed inwardly to allow arm 6 to move from the dotted line to the full line position, wheel 7 frictionally engages the corn seed drum 1 so as to be frictionally driven and rotated thereby and block a row of holes in the pockets 2.

While only four wheels 7, having identical controls are shown in FIG. 2, it will be readily apparent that one or two additional wheels with similar individual controls may be added. In each instance, it is possible to selectively control the planting of any single row or any combination of rows desired for simultaneous planting,— such as rows 1, 3 and 4 or only rows 1 and 2 etc.

The present control is flexible and positive in operation, quickly responsive and relatively simple in construction, requiring little or no maintenance.

Returning now to the general description of the CYCLO planter, air is harnessed to take seed from a master hopper 15, space it to give the population desired and deliver it to the furrow (not shown). It plants any size seed-corn, beans or milo through the same metering system.

The air powered metering and delivery system essentially has three moving parts: 1. a driven fan 16 that supplies about 10 ounces of air pressure to the seed drum 1. 2. a revolving seed drum 1, with six rows of perforated pockets 2, that selects and spaces the seed. 2. rubber air cut-off wheels 7 that ride the top of the seed drum.

In the planting operation, seed, in just the proper amount, is automatically fed into the bottom of the seed drum 1 through outlet 18 of a chute 19 leading from the master hopper 15. The driven fan 16 supplies air pressure to the enclosed revolving seed drum 1. The air pressure in the drum naturally escapes through the holes in the seed pockets 2. As it does so, it holds the seeds in the pockets 2 of the revolving drum. Just before the seed reaches the top of the revoluation, it passes a permanently mounted brush 20 that knocks off any excess seed that may have collected in a seed pocket. At the top of its revolution the drum passes under the air-cut-off wheels 7. The wheels that are moved into frictional drive contact with drum 1 momentarily close the holes, block the escaping air and the seeds 17 are carried into the corresponding seed tube manifold 21. Air pressure then carries them in spaced relationship through the corresponding seed tubes 22 and into the furrow behind the openers (not shown).

The seed is selected, released and ejected into the rows with clean, constant precision. There is no bounce or scatter of seed. The spacing or population is determined by the ground related speed of the seed drum.

Thus it will be seen that I have provided an efficient control system for a corn planter, which control system may be installed on a four row International Harvester 400 CYCLE corn planter, or similar device such a 6 or 8 row planter if a larger number of wheels 7 is used, to convert the planter so that instead of planting all rows simultaneously, it will enable selective planting of any one row or any combination of rows, simultaneously.

While I have illustrated and described a single specific embodiment of my invention, it will be understood that this is by way of illustration only and that various changes and modifications may be contemplated in my invention and within the scope of the following claims.

I claim:

1. In a seed planting trailer of the type having an air pressured drum driven by said trailer about its axis, which drum has a plurality of longitudinally extending rows of perforated pockets, evenly spaced about the periphery of said drum and a plurality of seed discharging pipes within said drum extending from the top portion thereof and leading to positions on the trailer immediately above the spaced rows to be planted; the improvement comprising a plurality of separate, pivotally mounted arms on the frame of said trailer, each arm having rotatably mounted thereon a rubber-tired wheel for selective movement to the top outer surface of the drum for closing and blocking escape of air through the contacting peripheral row of holes of said rows, control means for selectively pivoting said arms into and out of contact with selected peripheral rows of pockets, whereby seeds will drop out of said blocked pockets and will be blown by air pressure through said seed discharging pipes to the selected rows to be planted.

2. Apparatus as recited in claim 1 wherein said control means comprises a plurality of flexible cables, each having one end connected to one end of the corresponding pivotal arm carrying a wheel and the other end connected to a knob which may be pulled by the operator in the cabin of a tractor to effect separation of the wheel from the drum, whereby the operator may selectively move any one or a combination of said wheels so as to effect selective planting of one or a combination of rows, respectively.

* * * * *